United States Patent
Xiao et al.

(10) Patent No.: US 10,771,773 B2
(45) Date of Patent: Sep. 8, 2020

(54) HEAD-MOUNTED DISPLAY DEVICES AND ADAPTIVE MASKING METHODS THEREOF

(71) Applicant: HTC Corporation, Taoyuan (TW)

(72) Inventors: Bo-Wen Xiao, Taoyuan (TW); Fu-Cheng Fan, Taoyuan (TW); Chun-Ta Lin, Taoyuan (TW); Wei-Jen Chang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 614 days.

(21) Appl. No.: 15/592,496

(22) Filed: May 11, 2017

(65) Prior Publication Data
US 2018/0332268 A1    Nov. 15, 2018

(51) Int. Cl.
*H04N 13/363* (2018.01)
*H04N 13/332* (2018.01)
*H04N 13/344* (2018.01)
*G02B 27/01* (2006.01)

(52) U.S. Cl.
CPC ....... *H04N 13/363* (2018.05); *G02B 27/0172* (2013.01); *H04N 13/332* (2018.05); *H04N 13/344* (2018.05); *G02B 2027/0112* (2013.01); *G02B 2027/0118* (2013.01); *G02B 2027/0134* (2013.01); *G02B 2027/0138* (2013.01); *G02B 2027/0178* (2013.01)

(58) Field of Classification Search
CPC .. H04N 13/363; H04N 13/332; H04N 13/344; G02B 27/0172; G02B 2027/0118; G02B 2027/0138; G02B 2027/0112; G02B 2027/0134; G02B 2027/0178
See application file for complete search history.

(56) References Cited

U.S. PATENT DOCUMENTS

| | | | | |
|---|---|---|---|---|
| 2011/0169815 A1* | 7/2011 | Fattal | ...................... | G02F 1/292 345/212 |
| 2011/0221793 A1* | 9/2011 | King, III | .............. | G02B 27/017 345/690 |
| 2014/0225994 A1* | 8/2014 | Tung | ................... | H04N 13/144 348/51 |
| 2016/0260258 A1* | 9/2016 | Lo | ............................ | G06T 7/00 |

FOREIGN PATENT DOCUMENTS

| | | |
|---|---|---|
| CN | 101661163 A | 3/2010 |
| CN | 106125324 A | 3/2010 |
| CN | 103383491 A | 11/2013 |
| CN | 103389579 A | 11/2013 |
| CN | 103986924 A | 8/2014 |
| CN | 205608290 U | 9/2016 |
| TW | 201447375 A | 12/2014 |
| WO | WO 2016/011367 A2 | 1/2016 |

* cited by examiner

*Primary Examiner* — Oschta I Montoya
(74) *Attorney, Agent, or Firm* — Birch, Stewart, Kolasch & Birch, LLP

(57) ABSTRACT

A head-mounted display device including a display system and a light modulator is provided. The display system is configured to selectively display a first content to be visually recognized as being superimposed on a scenery of a surrounding environment, or not display the first content. The light modulator, positioned between the display system and the surrounding environment, includes an array of pixels, wherein a portion of the pixels is configured to modulate light to present a display of a second content, while the rest of the pixels are configured to be substantially transparent to light.

18 Claims, 12 Drawing Sheets

HEAD-MOUNTED DISPLAY DEVICES AND ADAPTIVE MASKING METHODS THEREOF

BACKGROUND OF THE APPLICATION

Field of the Application

The application relates generally to virtual or augmented reality headsets, and more particularly, to a head-mounted display device wherein a light modulator is positioned between the display and the surrounding environment to provide adaptive masking of lights to enhance the image.

Description of the Related Art

In recent years, virtual or augmented reality headsets have been proven invaluable in many applications, spanning the fields of scientific visualization, medicine, military training, engineering design and prototyping, tele-manipulation and tele-presence, and personal entertainment systems.

Augmented reality headsets overlay augmented content, such as 3-Dimensional (3D) content, 2-Dimensional (2D) overlays, text, virtual objects, etc., onto the view of the surrounding real-world environment. In other words, an augmented reality headset often shows a view of the real world that has been augmented to include either or both static and dynamic 2D or 3D content.

In contrast, virtual reality headsets generally present a completely virtual 2D or 3D environment in a way that replaces the view of the surrounding real-world environment. A variety of smartphone-based virtual reality devices are implemented as head-mounted devices that position smartphone displays directly in the viewer's field of view behind lenses for each eye. Such devices typically replace the viewer's field of view with a virtual view via the display screen of the smartphone to present the user with head-mounted wide-angle virtual displays.

BRIEF SUMMARY OF THE APPLICATION

In one aspect of the application, a head-mounted display device comprising a display system and a light modulator is provided. The display system is configured to selectively display a first content to be visually recognized as being superimposed on a scenery of a surrounding environment, or not display the first content. The light modulator is positioned between the display system and the surrounding environment, and comprises an array of pixels, wherein a portion of the pixels is configured to modulate light to present a display of a second content, while the rest of the pixels are configured to be substantially transparent to light.

In another aspect of the application, an adaptive masking method for a head-mounted display device is provided. The head-mounted display device comprises a display system and a light modulator which is positioned between the display system and a surrounding environment, and comprises an array of pixels. The adaptive masking method comprises the steps of: configuring the display system to selectively display a first content to be visually recognized as being superimposed on a scenery of the surrounding environment, or not display the first content; configuring a portion of the pixels to modulate light to present a display of a second content; and configuring the rest of the pixels to be substantially transparent to light.

Other aspects and features of the application will become apparent to those with ordinary skill in the art upon review of the following descriptions of specific embodiments of the head-mounted display devices and adaptive masking methods.

BRIEF DESCRIPTION OF THE DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof.

Figure 1:
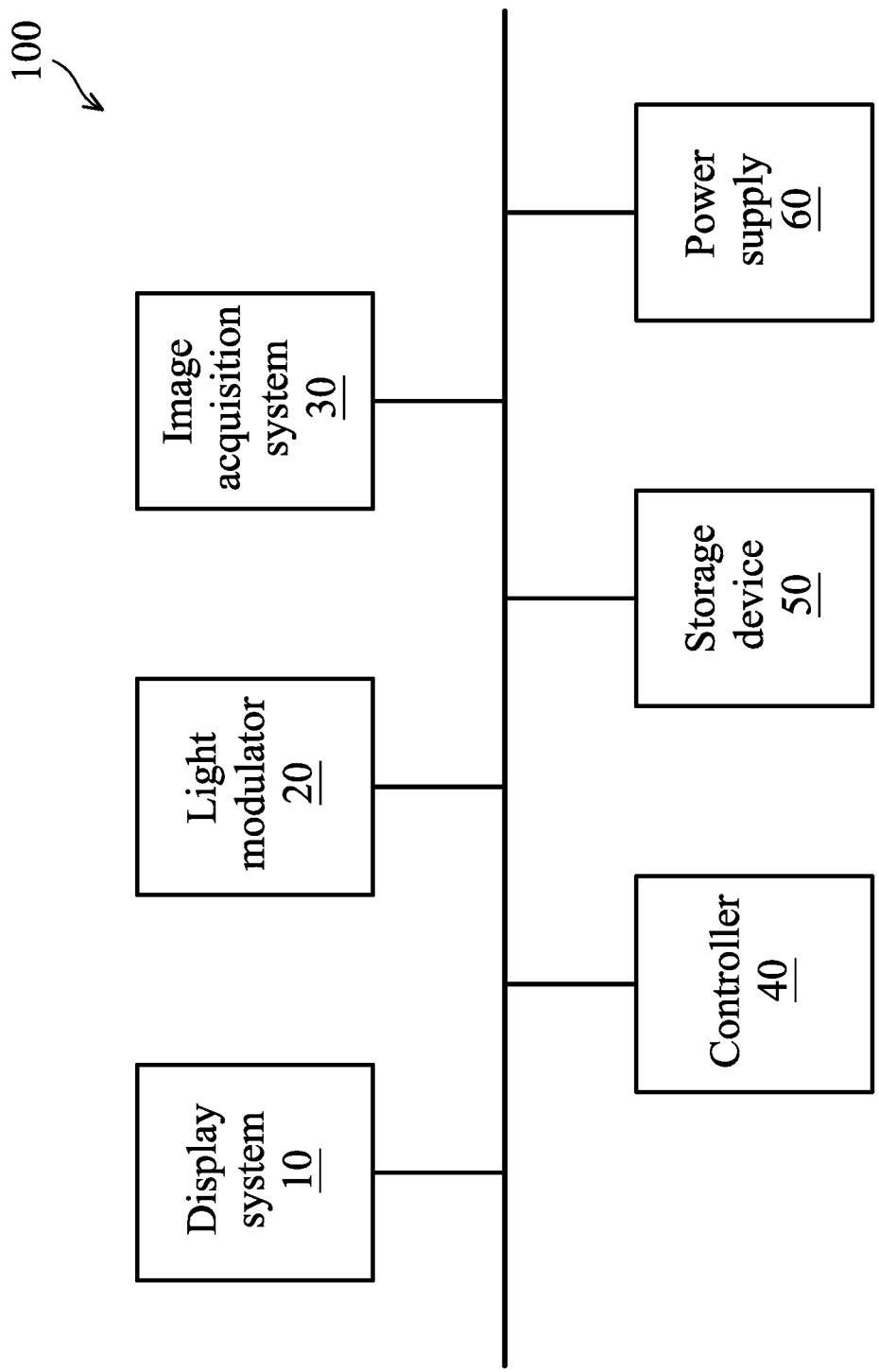
FIG. 1 is a block diagram illustrating a head-mounted display device according to an embodiment of the application.

FIG. 1 is a block diagram illustrating a head-mounted display device according to an embodiment of the application. The head-mounted display device 100 includes a display system 10, a light modulator 20, an image acquisition system 30, a controller 40, a storage device 50, and a power supply 60.

The display system 10 is responsible for displaying visual contents. In one embodiment, the display system 10 may include an optical engine and see-through optics, wherein the optical engine may project the visual contents to be displayed on the see-through optics. The optical engine may include one or more projectors, such as a nano-projector, pico-projector, micro-projector, femto-projector, Laser-based projector, holographic projector, or the like. The see-through optics may be referred to as an optical assembly which may includes a mirror/reflector and at least one lens, such as one waveguide lens and one translucent correction lens adhered to the waveguide lens, which enables proper viewing through the see-through optics regardless of whether the optical engine is on or off.

The light modulator 20 is positioned between the display system 10 and the surrounding environment, and is responsible for adaptive masking, filtering, or modulating of light coming from the surrounding environment to the display system 10. The light modulator 20 includes an array of pixels, each of which has a dimension smaller than a wavelength of the light to be modulated. Each of the pixels further has a permittivity that can be controlled using an electronic signal applied to the pixel, and a pattern of the permittivities of the pixels across the array causes diffraction that modulates the light. In particular, a portion of the pixels may be configured to modulate light to provide visual content, while the rest of the pixels may be configured to be substantially transparent to light.

In one embodiment, each pixel of the light modulator 20 may be configured to serve as a color filter which allows one or more of the red, green, and blue components (or cyan, magenta, and yellow components) of the incoming light to pass through, creating displays of visual content.

The light modulator 20 may be a Spatial Light Modulator (SLM) implemented by an Electrode-Wetting Display (EWD), a Liquid-Crystal Display (LCD), or an Organic Light-Emitting Diode (OLED).

Taking the EWD as an example, electro-wetting involves modifying the surface tension of liquids on a solid surface using a voltage. By applying a voltage, the wetting properties of a hydrophobic surface can be modified and the surface becomes increasingly hydrophilic (i.e., wettable). For an EWD, the modification of the surface tension is used to obtain a simple optical switch by contracting a colored oil film electrically. In one embodiment, the colored oil may be provided using the CMYK color model which is a subtractive color model requiring three basic color components: cyan, magenta, and yellow, or the colored oil may be provided using the RGB color model which is an additive color model requiring three basic color components: red, green, and blue. Without a voltage, the colored oil forms a continuous film and the color is visible to the consumer. When a voltage is applied to the display pixel, the oil is displaced and the pixel becomes transparent. When different pixels are independently activated, the display can show content like a photograph or a video. For example, each pixel may contain three subpixels, each of which is covered with an oil film that is in one of the three color components of the CMYK or RGB color model. When light shines through a subpixel, and then through the oil film, it produces colored light. By controlling how much light passes through each of the three subpixels to vary how much red, green, and blue (or cyan, magenta, and yellow) light is emitted, any color may be displayed.

Note that the light modulator 20 uses ambient light as the light source, in contrast to the display system 10 which relies on the projector(s) therein to emit light. The light modulator 20 uses much less power than the display system 10, in terms of image provision.

The image acquisition system 30 is responsible for acquiring images of the surrounding environment, so that information about the surrounding environment, such as positions, colors, and/or sizes of the objects, may be determined. The image acquisition system 30 may include at least one depth camera and one or more environment-understanding cameras, wherein the depth camera may be a greyscale, RGB (Red/Green/Blue), or CMYK (Cyan/Magenta/Yellow/Key) camera capable of depth sensing, positional tracking, and 3D mapping, and the environment understanding cameras may be greyscale, RGB, or CMYK cameras capable of object sensing.

The controller 40 may be a general-purpose processor, Micro-Control Unit (MCU), Digital Signal Processor (DSP), application processor, Graphics Processing Unit (GPU), or Holographic Processing Unit (HPU), or any combination thereof, which includes various circuits for providing the function of data and image processing/computing, sending a series of frame data (e.g. representing text messages, graphics, images, etc.) to the display system 10, sending control signals to the light modulator 20, receiving images of the surrounding environment from the image acquisition system 30, and storing and retrieving data to and from the storage device 50.

In particular, the controller 40 coordinates the aforementioned operations of the display system 10, the light modulator 20, the image acquisition system 30, and the storage device 50 for performing the adaptive masking method of the present application.

As will be appreciated by persons skilled in the art, the circuits in the controller 40 will typically comprise transistors that are configured in such a way as to control the operation of the circuitry in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 50 is a non-transitory machine-readable storage medium, including a memory, such as a FLASH memory or a Non-volatile Random Access Memory (NVRAM), or a magnetic storage device, such as a hard disk or a magnetic tape, or an optical disc, or any combination thereof for storing frame data and instructions or program code of communication protocols, applications, and/or the adaptive masking method of the present application.

The power supply 60 may be a portable/replaceable and chargeable battery, which provides power to the display system 10, the light modulator 20, the image acquisition system 30, the controller 40, and the storage device 50, and allows portability of the head-mounted display device 100.

It should be understood that the components described in the embodiment of FIG. 1 are for illustrative purposes only and are not intended to limit the scope of the application. In another embodiment, the head-mounted display device 100 may include additional or different components. For example, the head-mounted display device 100 may further include one or more buttons, a microphone, a speaker, an ambient light sensor, a wireless communication device, and/or a Global Positioning System (GPS) device, etc. The buttons, microphone, and speaker may serve as a Man-Machine Interface (MMI) for user interaction. The ambient light sensor may be used to detect the lighting condition of the surrounding environment. The wireless communication device may include a Bluetooth or Wireless-Fidelity (WiFi) chipset enabling short-range wireless communications with other mobile communication devices, such as smartphones or panel Personal Computer (PC). The GPS device may provide position information of the head-mounted display device 100 for use of some location-based services or applications.

Figure 2:
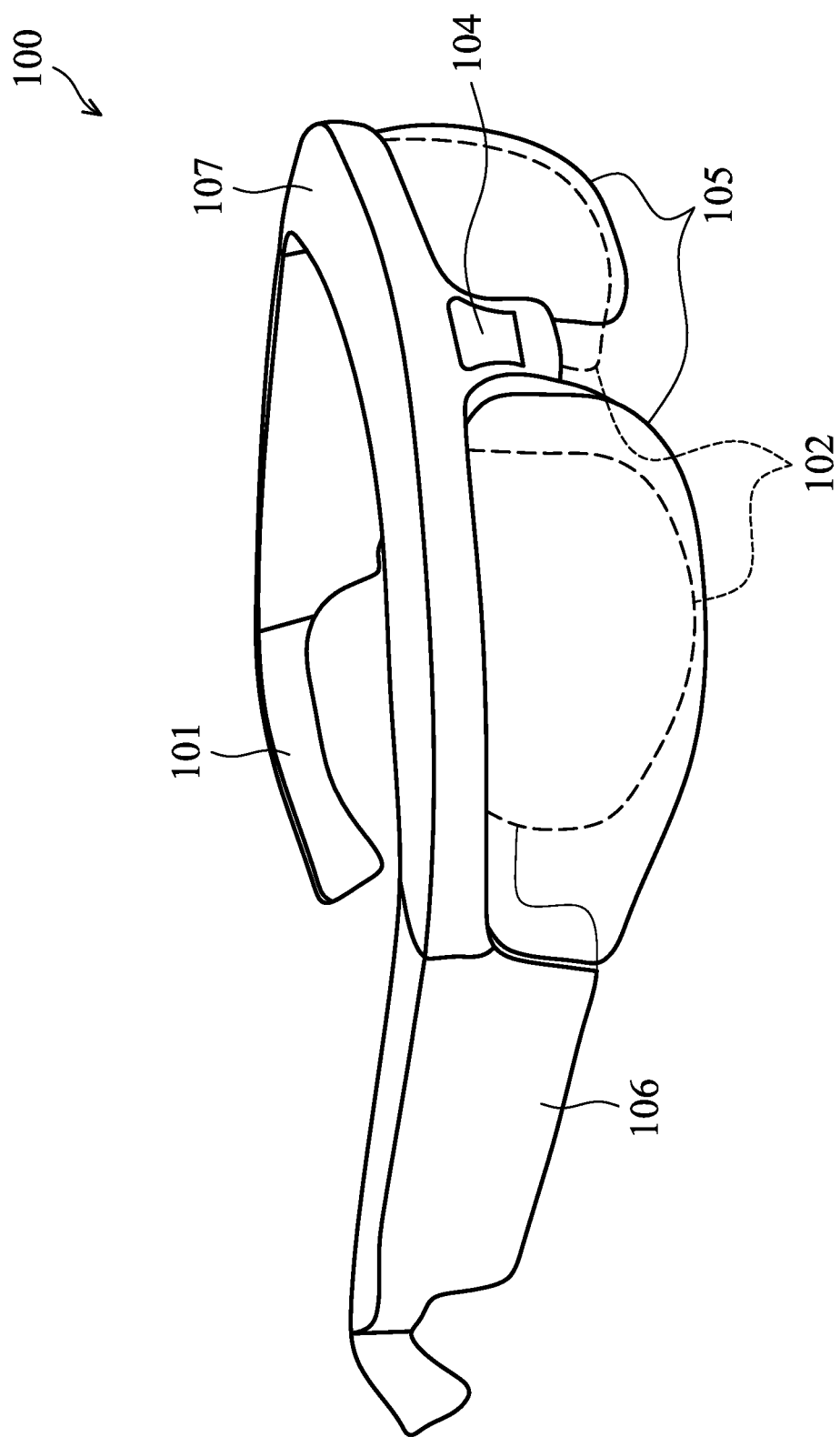
FIG. 2 depicts an illustrative embodiment of optical arrangement of the head-mounted display device 100.

FIG. 2 depicts an illustrative embodiment of optical arrangement of the head-mounted display device 100. In this embodiment, the head-mounted display device 100 is implemented as a virtual or augmented reality headset or eyepiece.

As shown in FIG. 2, the display system 10 may be disposed in the lower-front portion 102 of the frame 101 of the headset/eyepiece. Images may be projected onto the lens parts of the display system 10. The image acquisition system 30 may be disposed in the upper-front portion 104 of the frame 101 of the headset/eyepiece. The light modulator 20 may be disposed in the lower-front portion 105 which is spaced apart from the lower-front portion 102 and is positioned ahead of the lower-front portion 102. The rest of the components, such as the controller 40, the storage device 50, and the power supply 60, may be embedded in the arm portion 106 of the frame 101, the center-front portion 107 of the frame 101, or any unused portion of the frame 101.

Figure 3:
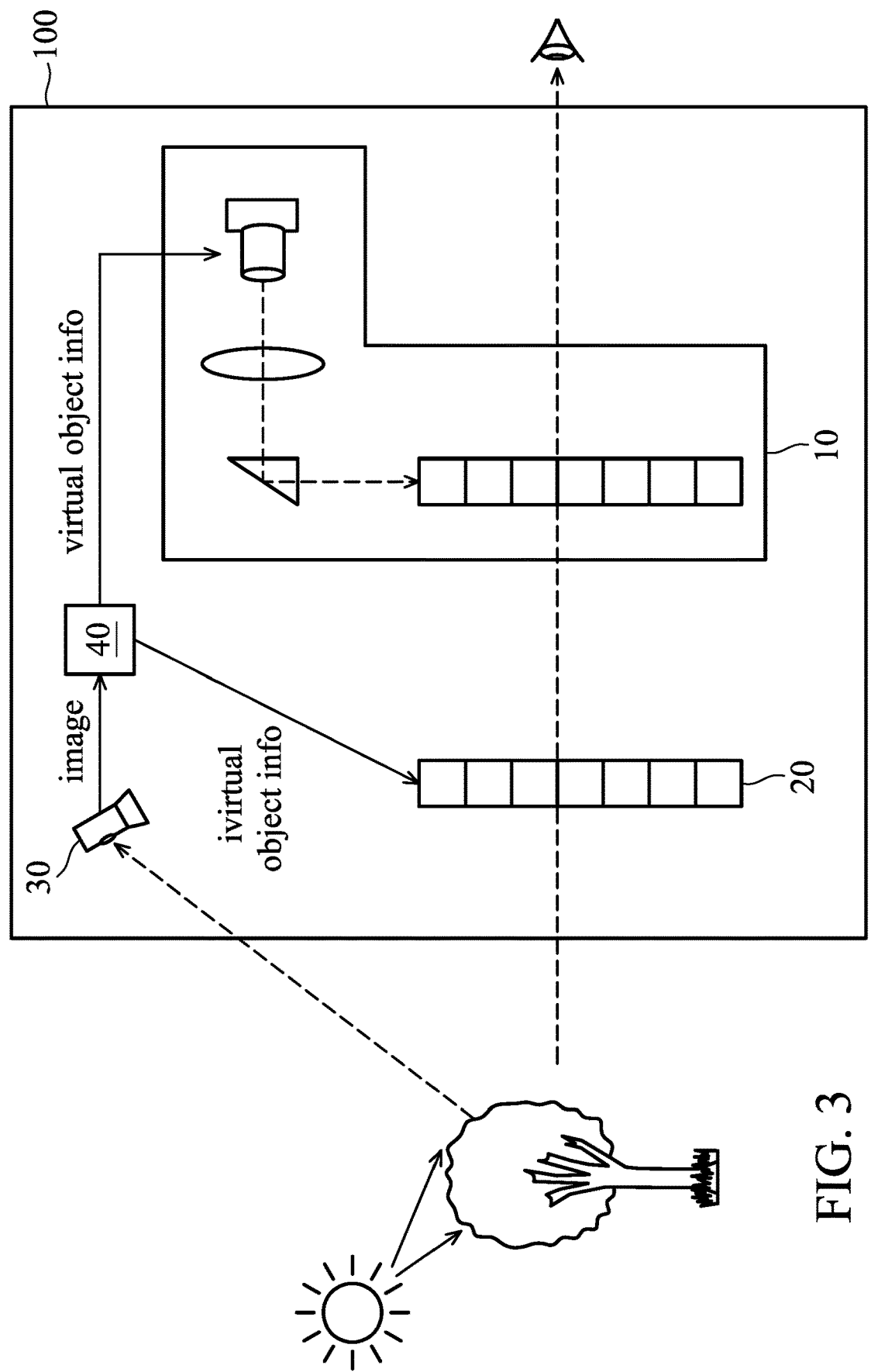
FIG. 3 is a schematic diagram illustrating configuration of the head-mounted display device 100 in the surrounding environment according to an embodiment of the application.

FIG. 3 is a schematic diagram illustrating configuration of the head-mounted display device 100 in the surrounding environment according to an embodiment of the application. In one embodiment, the head-mounted display device 100 may be worn by a viewer to see through to the surrounding environment with the sun being the ambience light source, and the viewer's view of a real object, i.e., a tree, in the surrounding environment comes in the line-of-sight direction to the light modulator 20, the display system 10, and the viewer's eye in sequence.

The image acquisition system 30 acquires the image of the surrounding environment including the tree, and sends the image to the controller 40 to be analyzed to understand the surrounding environment.

The controller 40 analyzes the image to determine the object information of the scenery of the surrounding environment, wherein the object information includes the size, color, and/or 3D position of objects in the surrounding environment. Then, the controller 40 sends information of a virtual object to the light modulator 20 and the display system 10, wherein the position of the virtual object is determined according to parameters, such as the position of the tree and the ambient brightness.

In response to receiving the information of the virtual object, the display system 10 displays the virtual object, while the light modulator 20 modulates light coming from the surrounding environment to the display system 10, to enhance the display of the virtual object.

Figure 4A:
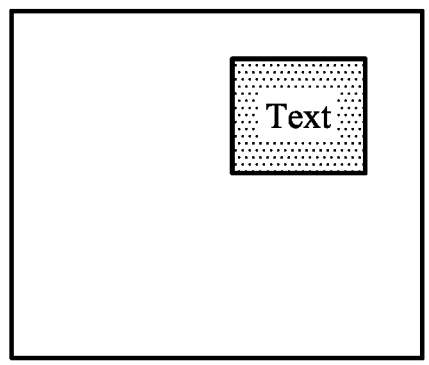
FIG. 4A depicts an exemplary display of a visual content by the display system 10.

FIG. 4A depicts an exemplary display of a visual content by the display system 10. As shown in FIG. 4A, the display of a text in a block is provided by the display system 10, wherein the background color of the block is a light color, such as light blue, and the block is positioned at the right of the view where the block covers a slight portion of the right-side of the tree.

Figure 4B:
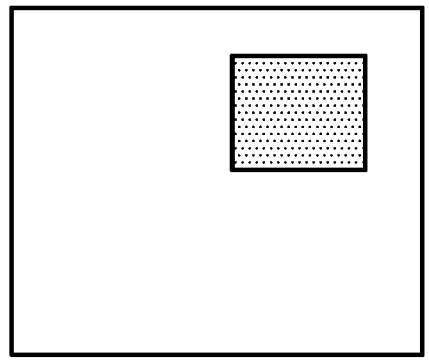
FIG. 4B depicts an exemplary display of a visual content by the light modulator 20.

FIG. 4B depicts an exemplary display of a visual content by the light modulator 20. As shown in FIG. 4B, the display of a block is provided by the light modulator 20. In particular, the position of the block is the same as the position of the block provided by the display system 10, and the background color of the block is the same as the background color of the block displayed by the display system 10.

Advantageously, the brightness and/or contrast of the image of the visual content provided by the display system 10 is enhanced by the light modulator 20.

Figure 4C:
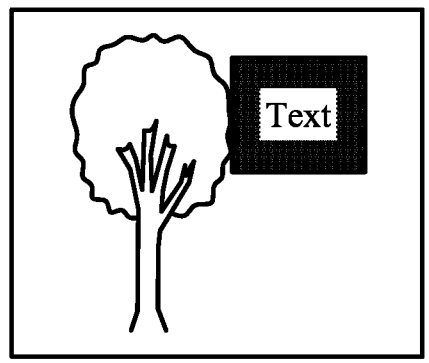
FIG. 4C depicts an exemplary display of an augmented reality established from the scene of the surrounding environment and the displays by the display system 10 and the light modulator 20.

FIG. 4C depicts an exemplary display of an augmented reality established from the scene of the surrounding environment and the displays by the display system 10 and the light modulator 20. As shown in FIG. 4C, the background color of the block is intensified, e.g., from light blue to blue, so that the display of the visual content by the display system 10 can be clearly recognized even when the ambient light is too strong.

Figure 5A:
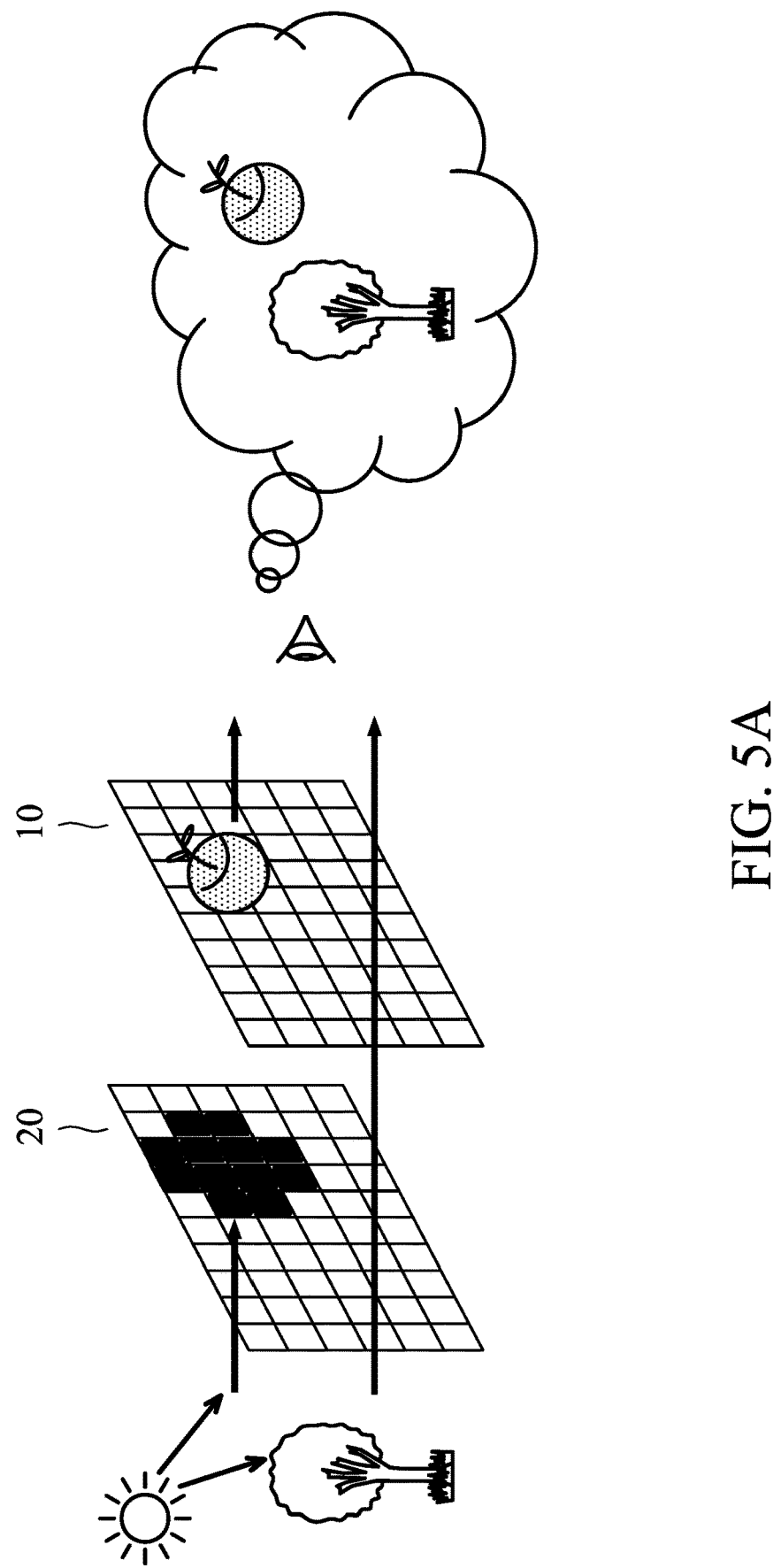
FIG. 5A depicts one embodiment of imaging enhancement by configuring the light modulator 20 to block light towards the virtual object.
Figure 5B:
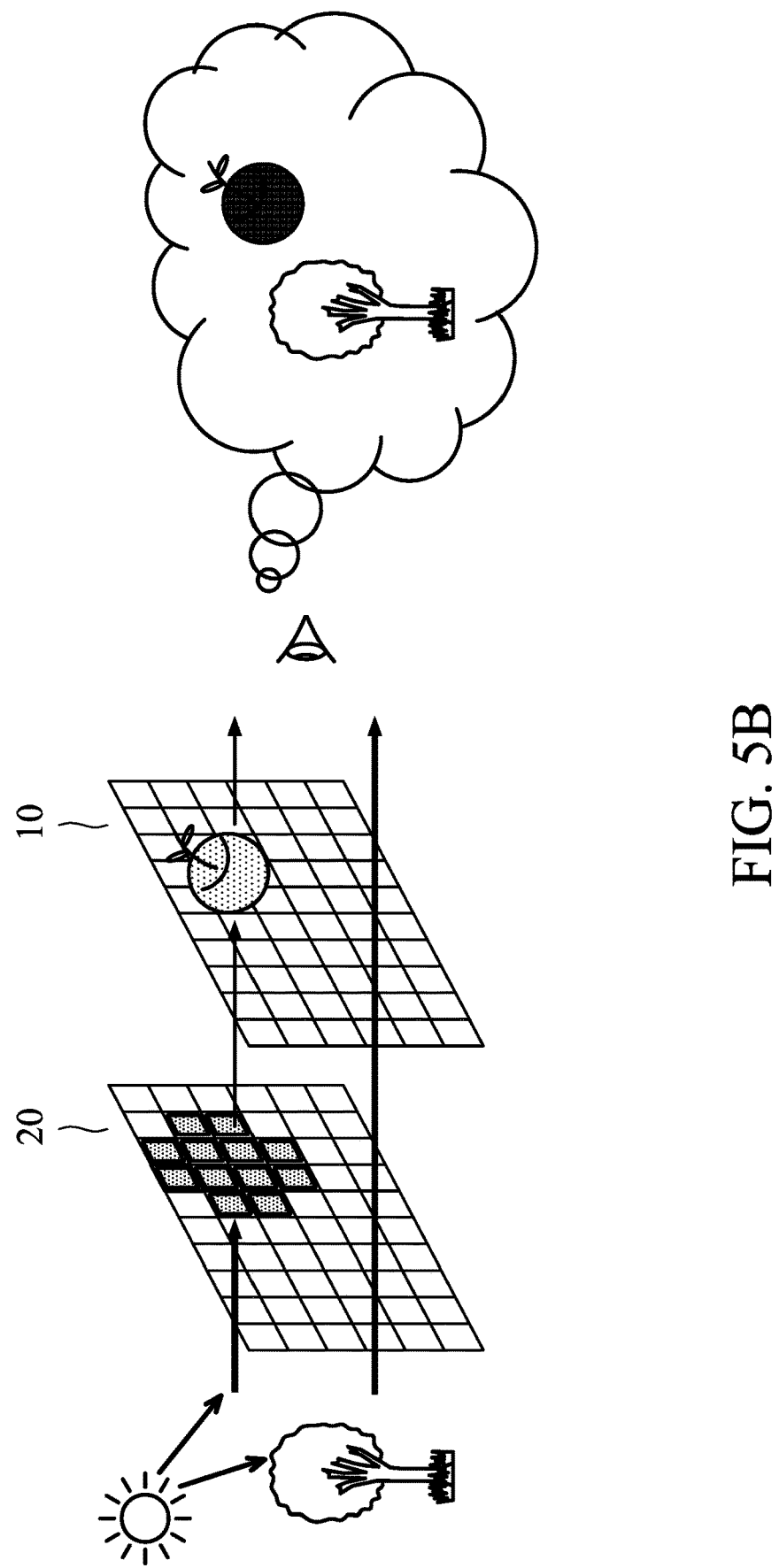
FIG. 5B depicts one embodiment of imaging enhancement by configuring the light modulator 20 to filter certain color component(s) of light coming to the position of the virtual object.
Figure 5C:
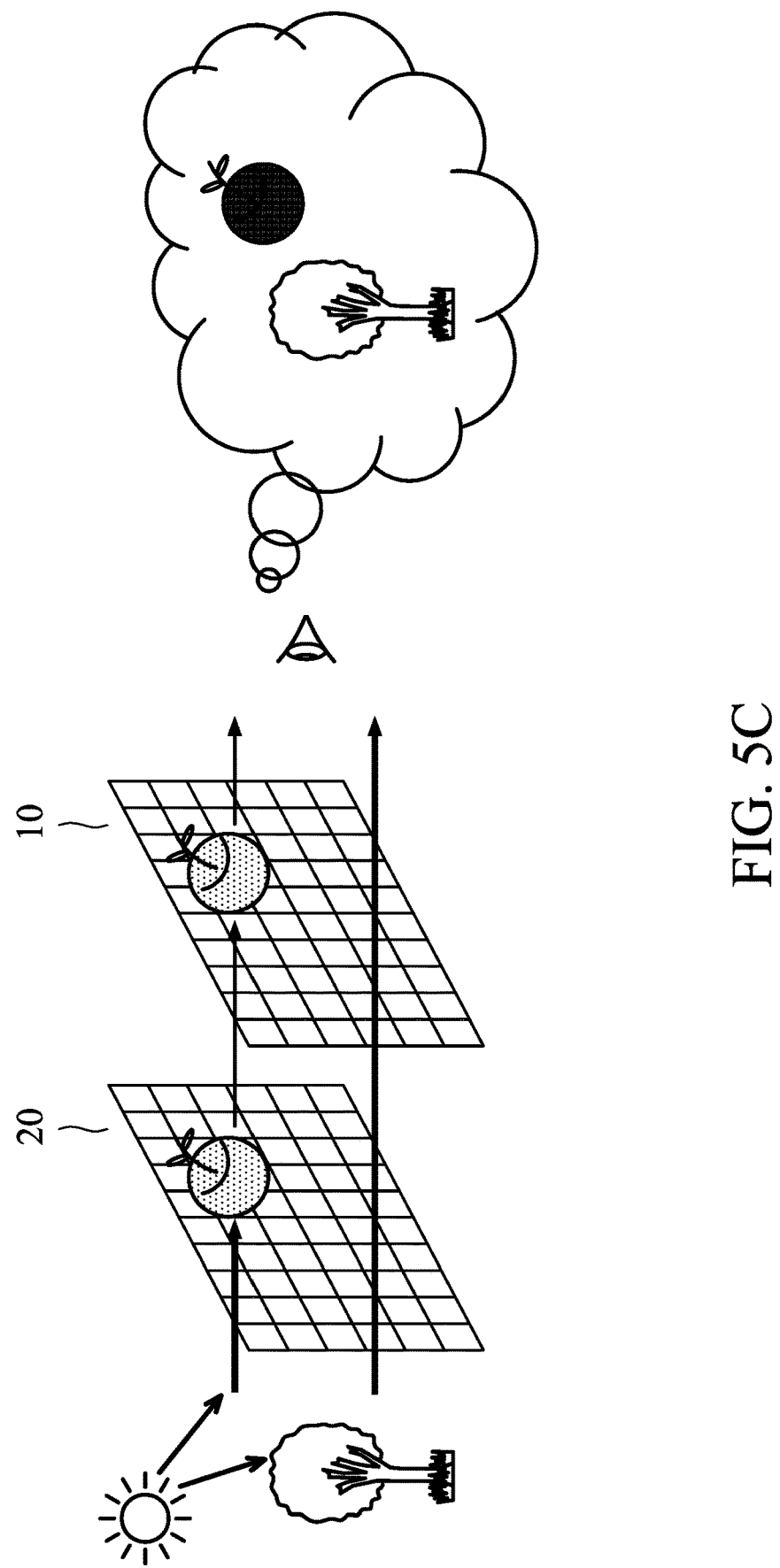
FIG. 5C depicts another embodiment of imaging enhancement by configuring the light modulator 20 to filter certain color component(s) of light coming to the position of the virtual object.

FIGS. 5A to 5C show embodiments of enhancing the image of a virtual object in an augmented reality. FIG. 5A depicts one embodiment of imaging enhancement by configuring the light modulator 20 to block light towards the virtual object.

As shown in FIG. 5A, the display system 10 displays an image of an apple to be visually recognized as being superimposed on the scenery of the surrounding environment, wherein the apple is positioned to the right of the tree in the view. Meanwhile, the light modulator 20 also provides substantially the same image, by configuring the portion of the pixels therein which correspond approximately to the position of the apple to block light coming from the surrounding environment, and configuring the rest of the pixels to be substantially transparent to ambient light.

Advantageously, the display of a virtual content is enhanced with higher brightness and/or contrast. Especially when the ambient light is too strong, the display system 10 may not increase the projection power while providing a clear image of the virtual content.

FIG. 5B depicts one embodiment of imaging enhancement by configuring the light modulator 20 to filter certain color component(s) of light coming to the position of the virtual object. Similar to the embodiment of FIG. 5A, the display system 10 displays an image of an apple, and the light modulator 20 provides substantially the same image.

Assuming that the color of the apple is red, the portion of the pixels in the light modulator 20, which correspond approximately to the position of the apple, is configured as a red filter which only allows red light through, while the rest of the pixels are configured to be substantially transparent to ambient light.

Likewise, the display of a virtual content is enhanced with higher brightness and/or contrast. Especially when the ambient light is too strong, the display system 10 may not increase the projection power while providing a clear image of the virtual content.

Alternatively, the portion of the pixels which correspond approximately to the position of the apple may be configured to allow a different colored light (e.g., dark-red light) through, so as to realize the enhancement of the display of the virtual apple. In another embodiment, said enhancement may include changing the color of the virtual content or the real object in the surrounding environment. For example, the portion of the pixels which correspond approximately to the position of the apple or the tree may be configured as a blue filter which only allows red light through, and the red light alters the red apple to appear as a purple apple or alters the green tree to appear as a cyan tree.

FIG. 5C depicts another embodiment of imaging enhancement by configuring the light modulator 20 to filter certain color component(s) of light coming to the position of the virtual object. Similar to the embodiment of FIG. 5A, the display system 10 displays an image of an apple, and the light modulator 20 provides substantially the same image.

Assume that the stem of the apple is brown, the leaves are green, and the apple is red. In the light modulator 20, the portion of the pixels which correspond approximately to the position of the stem part is configured as a brown filter which only allows brown light through, the portion of the pixels which correspond approximately to the position of the leaves part is configured as a green filter which only allows green light through, and the portion of the pixels which correspond approximately to the position of the apple is configured as a red filter which only allows red light through. That is, the light modulator 20 may provide adaptive and fine adjustment of color filtering to correspond to the details of the visual content.

Likewise, the display of virtual content is enhanced with higher brightness and/or contrast. Especially when the ambient light is too strong, the display system 10 may not increase the projection power while providing a clear image of the virtual content.

Alternatively, due to the fact that the brightness and/or contrast of the visual content displayed by the strong ambient light and the light modulator 20 may be good enough, the display system 10 may be configured to reduce the projection power or even turn off the display function when the ambient light is strong. That is, the head-mounted display system 100 may use the image acquisition system 30 or an ambient light sensor to detect the brightness of the ambient light, and accordingly, determine how to adjust the projection power of the display system 10.

Figure 6A:
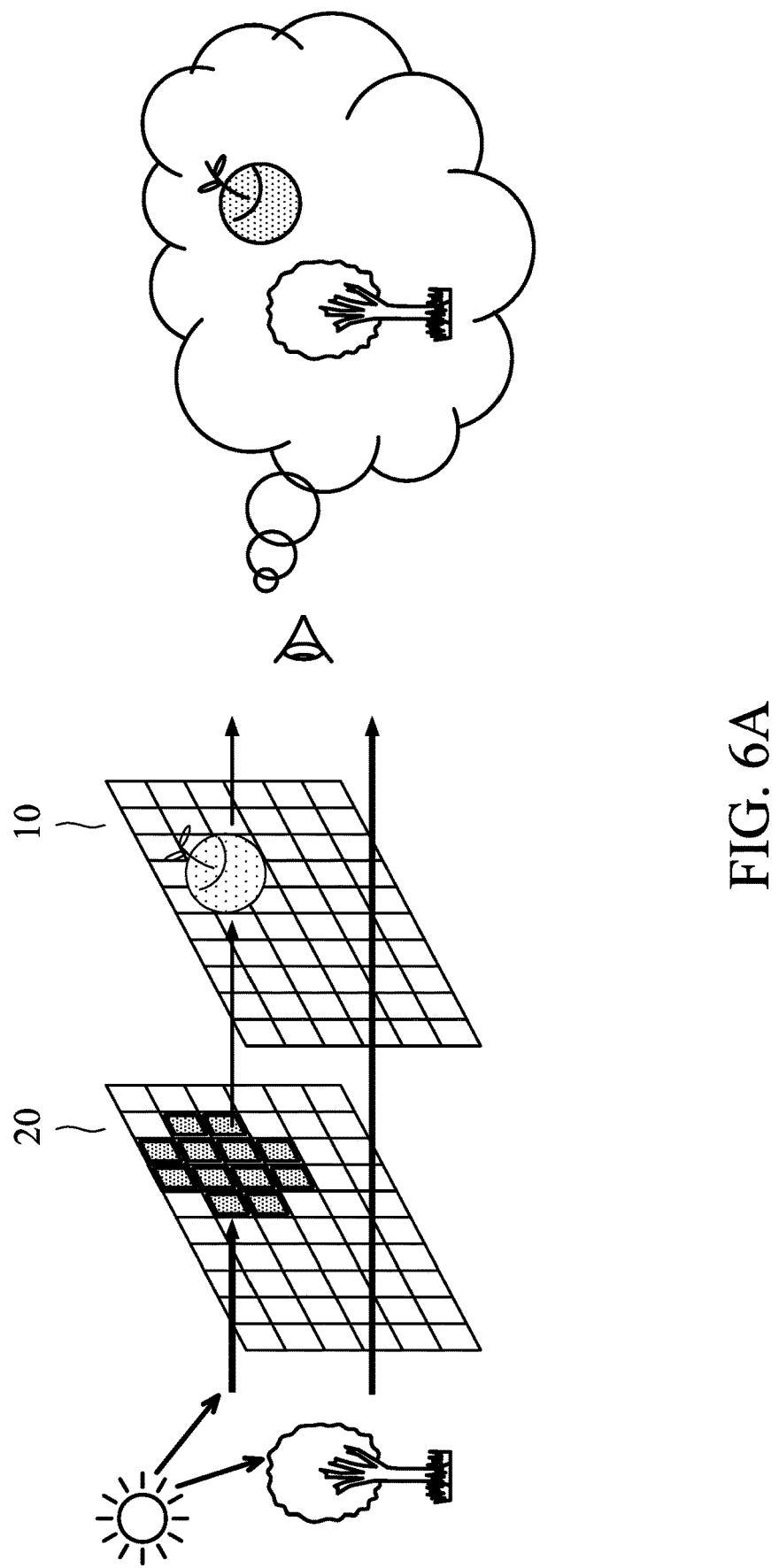
FIG. 6A depicts one embodiment of relying mainly on the light modulator 20 to provide a clear display of a visual content.

FIG. 6A depicts one embodiment of relying mainly on the light modulator 20 to provide a clear display of a visual content. In this embodiment, the ambient light is strong enough to allow the light modulator 20 to provide a clear image of an apple by modulating ambient light.

Specifically, in the light modulator 20, the portion of the pixels, which correspond approximately to the position of the apple, is configured as a color filter which only allows single-colored light (e.g., red light) through, while the rest of the pixels are configured to be substantially transparent to ambient light.

On the other hand, the display system 10 may be configured to apply a low power level to project the image of the same apple. That is, according to the lighting condition of the surrounding environment, the controller 40 adjusts the projection power used by the display system 10 and the power level applied to allow the light modulator 20 to modulate light.

Advantageously, the display system 10 may reduce the projection power while providing a clear image of the virtual content.

Figure 6B:
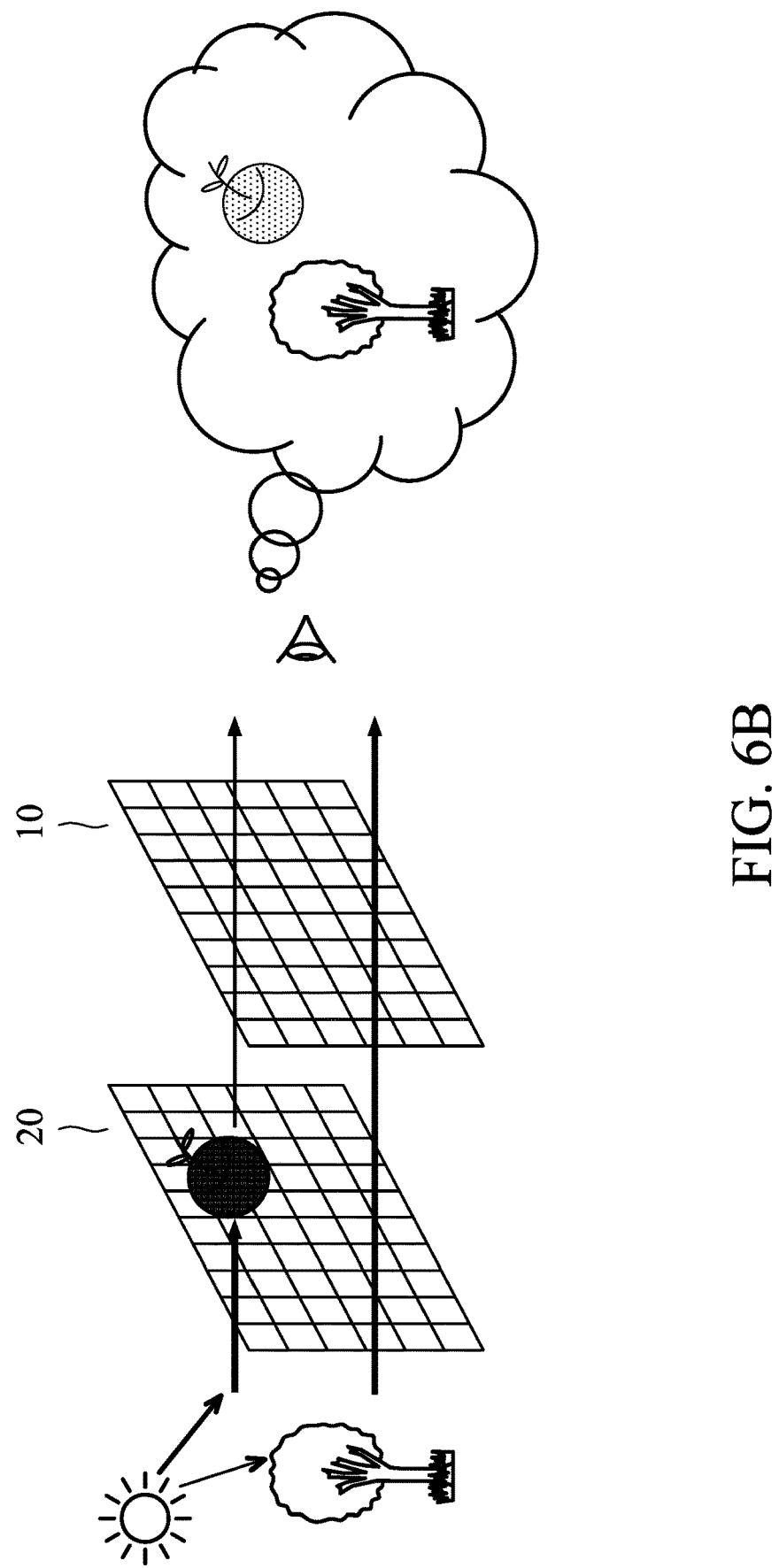
FIG. 6B depicts one embodiment of relying solely on the light modulator 20 to provide a clear display of a visual content.

FIG. 6B depicts one embodiment of relying solely on the light modulator 20 to provide a clear display of a visual content. Similar to the embodiment of FIG. 6A, the ambient light is strong enough to allow the light modulator 20 to provide a clear image of an apple by modulating the ambient light.

However, in this embodiment, the display system 10 is configured to turn off the display function (i.e., not projecting the image of the same apple), and the image of the apple is provided solely by the light modulator 20. That is, according to the lighting condition of the surrounding environment, the controller 40 adjusts the projection power used by the display system 10 and the power level applied to allow the light modulator 20 to modulate light.

Advantageously, the power consumption of the head-mounted display device 100 may be significantly reduced while providing a clear image of the virtual content.

Figure 6C:
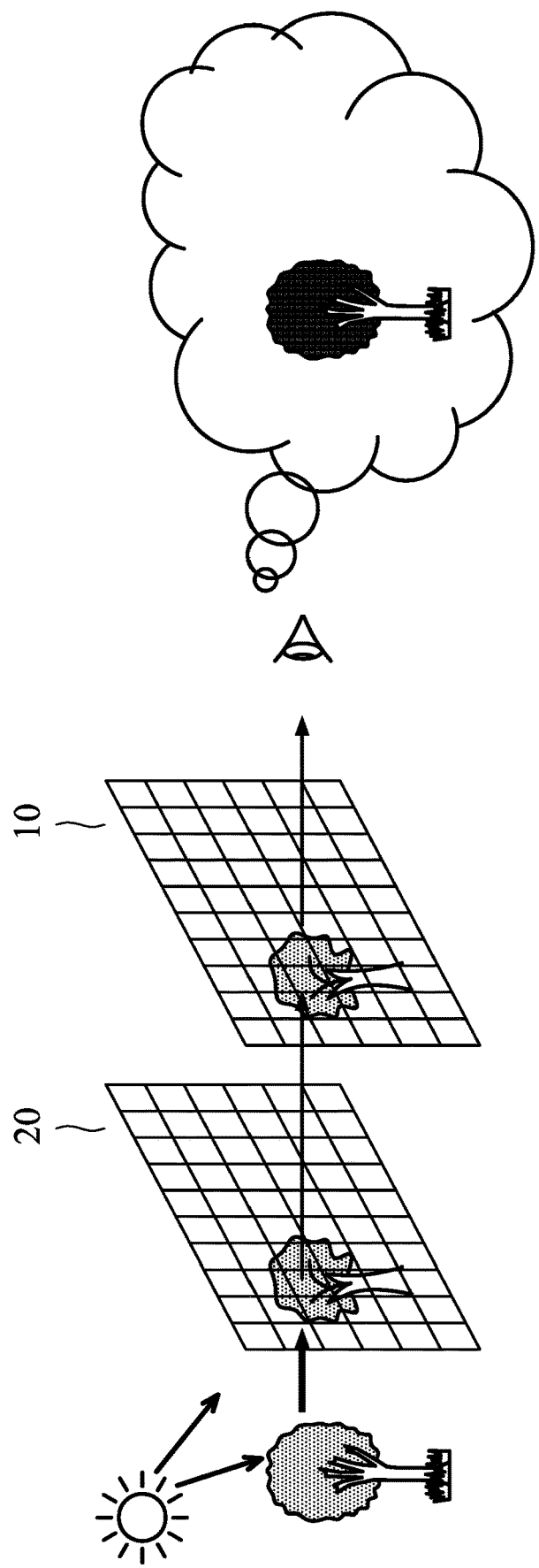
FIG. 6C depicts one embodiment of using one or both of the display system 10 and the light modulator 20 to enhance the display of a real object.

FIG. 6C depicts one embodiment of using one or both of the display system 10 and the light modulator 20 to enhance the display of a real object. In this embodiment, a tree is presented in the surrounding environment.

As shown in FIG. 6C, one or both of the display system 10 and the light modulator 20 may be configured to display the image of the tree, which is captured by the image acquisition system 30 of the head-mounted display device 100, in the position corresponding to the real tree in the view, so that images displayed are superimposed on the view of the real tree.

Advantageously, the display of the real object is enhanced with higher brightness and/or contrast. Alternatively, the display system 10 and/or the light modulator 20 may display the image in a different color to change the perceived image.

Figure 7:
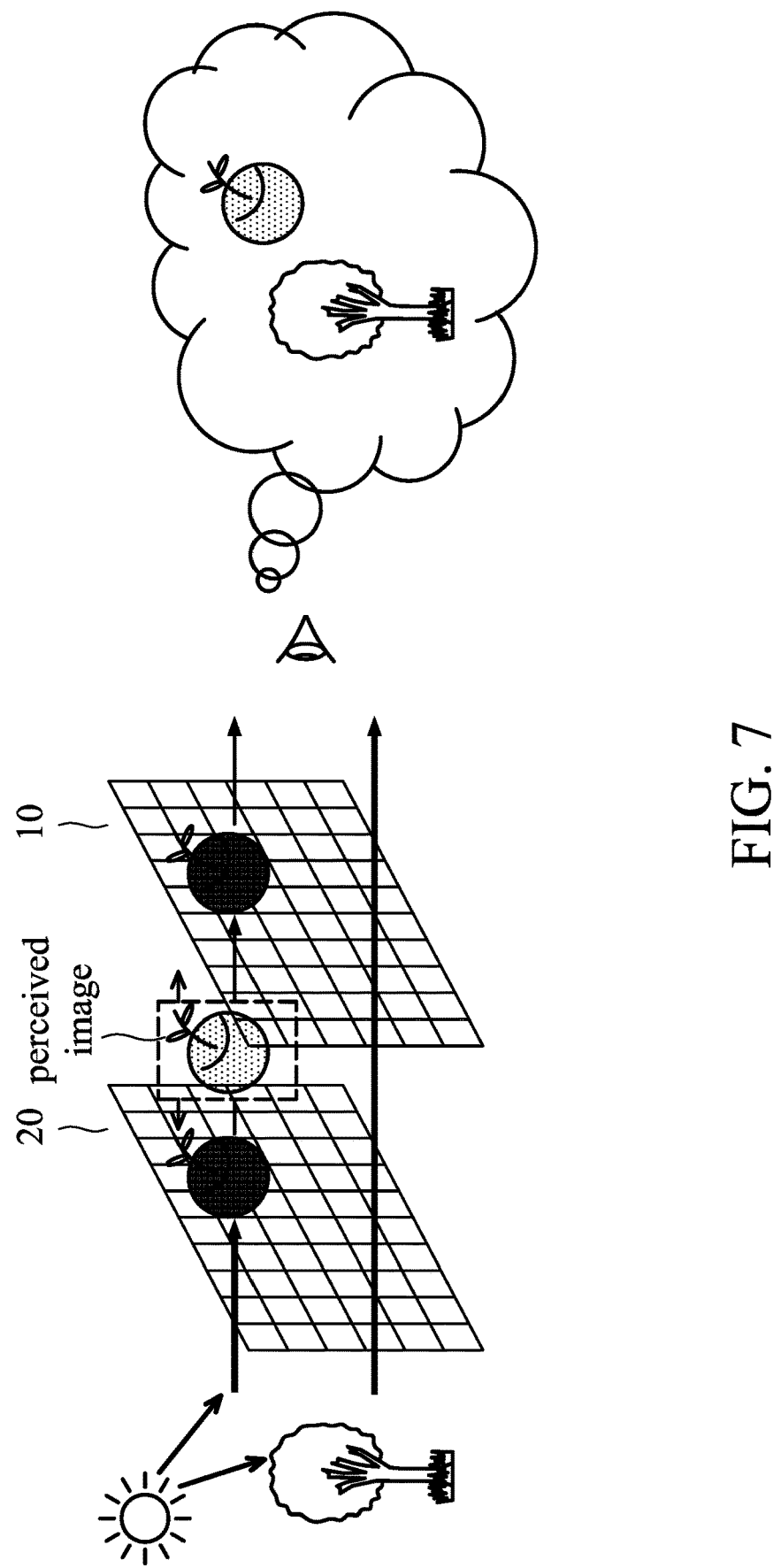
FIG. 7 depicts one embodiment of providing a depth-fused display of a virtual content in an augmented reality.

FIG. 7 depicts one embodiment of providing a depth-fused display of a virtual content in an augmented reality. In this embodiment, the display system 10 displays an image of an apple, while the light modulator 20 also provides substantially the same image by configuring the portion of the pixels therein which correspond to the position of the apple to filter the light of the same color as the apple.

As shown in FIG. 7, the display system 10 and the light modulator 20 are disposed in parallel and are vertical to the line-of-sight direction of the viewer, wherein the light modulator 20 is spaced apart from the display system 10 by a predetermined distance. This configuration of the display system 10 and the light modulator 20 may render a visual effect of depth-fused display of the apple, by controlling the brightness of the images provided by the display system 10 and the light modulator 20.

For example, the perceived depth of the apple may be further away from the viewer if the brightness of the image provided by the light modulator 20 is relatively higher than the brightness of the image provided by the display system 10.

Alternatively, the perceived depth of the apple may be closer to the viewer if the brightness of the image provided by the display system 10 is relatively higher than the brightness of the image provided by the light modulator 20.

Figure 8:
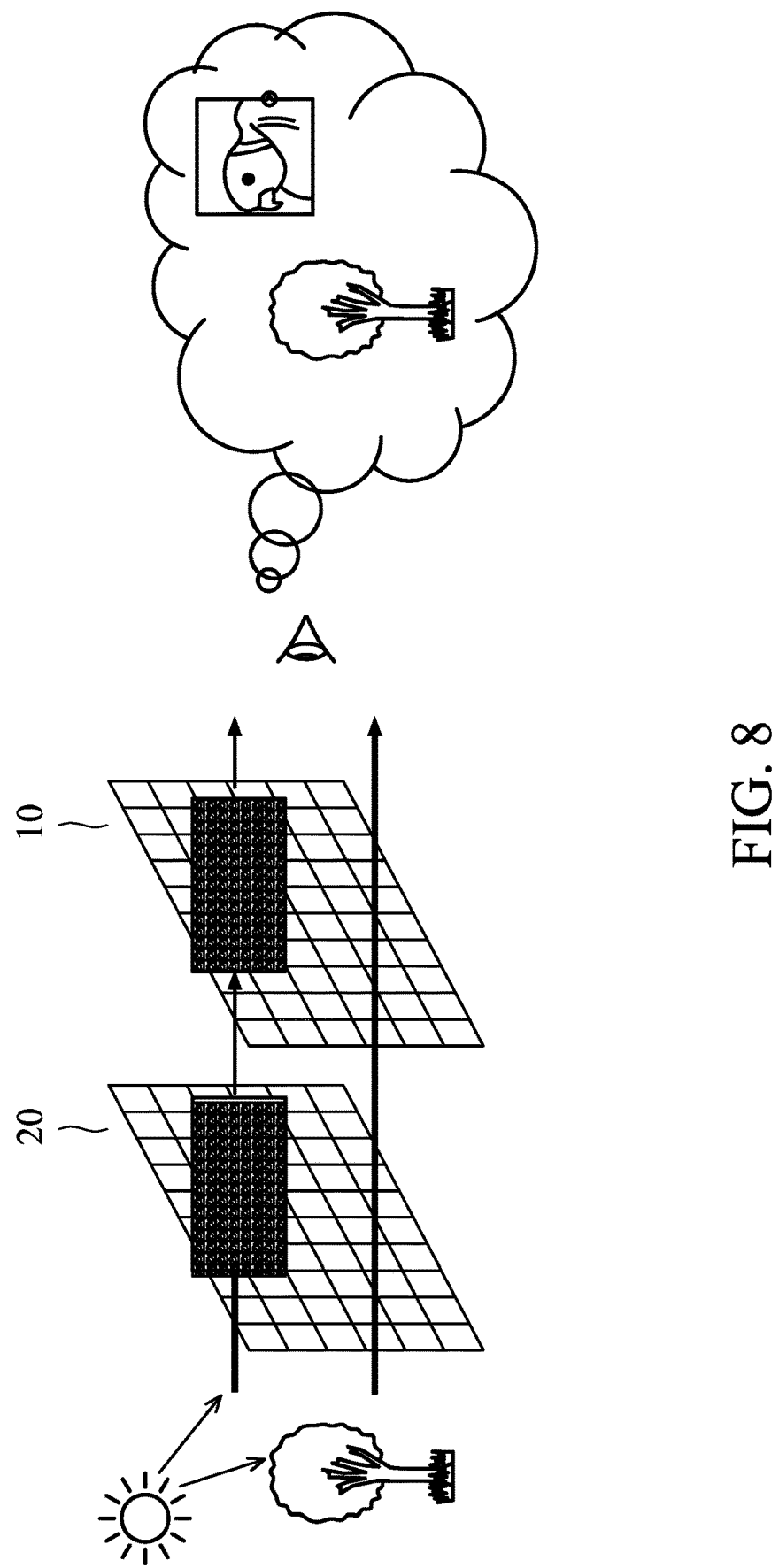
FIG. 8 depicts one embodiment of providing a 3D display of a virtual content in an augmented reality.

FIG. 8 depicts one embodiment of providing a 3D display of a virtual content in an augmented reality. In this embodiment, the display system 10 displays a light-field image of a parrot, while the light modulator 20 also provides substantially the same image by configuring the corresponding pixels to filter the light of the same color as the light-field image. The light-field image may be a grid of M-by-N (e.g., 8×15) sub-views, each of which is captured from a scene in one of many directions and/or one of many illumination conditions.

As shown in FIG. 8, the display system 10 and the light modulator 20 are disposed in parallel and are vertical to the line-of-sight direction of the viewer, wherein the light modulator 20 is spaced apart from the display system 10 by a predetermined distance. Particularly, the display system 10 and the light modulator 20 are disposed in a near-eye distance to the viewer. With such multi-layer displays of the same light-field image, a 3D image of the parrot is perceived by the viewer.

In view of the forgoing embodiments, it will be appreciated that the present application realizes enhancements of image displays, by introducing a light modulator disposed between the display system and the surrounding environment to provide visual effects, such as intensifying the brightness and/or contrast of the image of a real or virtual object, changing the color, brightness, and/or contrast of the image of a real or virtual object, or providing depth-fused display or 3D display of a virtual object. Advantageously, the projection power required by the display system 10 may be efficiently reduced, while providing a clear image of the real or virtual object.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

What is claimed is:

1. A head-mounted display device, comprising:
a display system, configured to selectively display a first content to be visually recognized as being superimposed on a scenery of a surrounding environment, or not display the first content;
a light modulator, positioned between the display system and the surrounding environment, comprising an array of pixels, wherein a portion of the pixels is configured to modulate light to present a display of a second content, while the rest of the pixels are configured to be substantially transparent to light;
an ambient light sensor, configured to detect a lighting condition of the surrounding environment; and
a controller, configured to adjust, according to the lighting condition, at least one of a first power level applied to allow the display system to display the first content, and a second power level applied to allow the light modulator to modulate light,
wherein the adjustment of at least one of the first power level and the second power level comprises: increasing the second power level and decreasing the first power level when the lighting condition indicates that a brightness is greater than a predetermined threshold, and increasing the first power level and decreasing the second power level when the lighting condition indicates that the brightness is lower than the predetermined threshold.

2. The head-mounted display device of claim 1, wherein each of the first content and the second content comprises the same image, and the portion of the pixels is configured to modulate light coming from the surrounding environment to the displayed first content, causing the displayed second content to be visually superimposed over the displayed first content to enhance at least one of a brightness and a contrast of the image.

3. The head-mounted display device of claim 1, wherein each of the first content and the second content comprises the same image and is displayed with a respective brightness level, and the portion of the pixels is configured to modulate light coming from the surrounding environment to the displayed first content, causing the displayed second content to be visually superimposed over the displayed first content to render a depth of the image adjustable by changing the brightness levels.

4. The head-mounted display device of claim 1, wherein the portion of the pixels is configured to modulate light coming from an object in the scenery to enhance at least one of a brightness and a contrast of the object.

5. The head-mounted display device of claim 1, further comprising:
an image acquisition system, configured to capture an image of the scenery; and
a controller, configured to determine object information concerning at least one of a size, a color, and a 3D position of an object in the scenery according to the image;
wherein the first content is displayed according to the object information, and the light modulation is performed according to the object information.

6. The head-mounted display device of claim 1, wherein the light modulator is an Electro-Wetting Display (EWD), a Liquid-Crystal Display (LCD), or an Organic Light-Emitting Diode (OLED) display.

7. The head-mounted display device of claim 1, wherein each of the pixels has a permittivity that can be controlled using an electronic signal applied to the pixel, and a pattern of the permittivities of the pixels across the array causes diffraction that modulates light.

8. The head-mounted display device of claim 1, wherein the display system comprises an optical assembly and a projector for introducing the first content to the optical assembly for display.

9. The head-mounted display device of claim 1, wherein each of the first content and the second content comprises the same light-field image, and the portion of the pixels is configured to modulate light coming from the surrounding environment to the displayed first content, causing the displayed second content to be visually superimposed over the displayed first content to render a three-dimensional (3D) visual effect.

10. An adaptive masking method for a head-mounted display device comprising a display system and a light modulator which is positioned between the display system and a surrounding environment, and comprises an array of pixels, the adaptive masking method comprising:
configuring the display system to selectively displays a first content to be visually recognized as being superimposed on a scenery of the surrounding environment, or not display the first content;
configuring a portion of the pixels to modulate light to present a display of a second content;
configuring the rest of the pixels to be substantially transparent to light;
detecting, via an ambient light sensor, a lighting condition of the surrounding environment; and
adjusting, according to the lighting condition, at least one of a first power level applied to allow the display system to display the first content, and a second power level applied to allow the light modulator to modulate light,
wherein the adjustment of at least one of the first power level and the second power level comprises: increasing the second power level and decreasing the first power level when the lighting condition indicates that a brightness is greater than a predetermined threshold, and increasing the first power level and decreasing the second power level when the lighting condition indicates that the brightness is lower than the predetermined threshold.

11. The adaptive masking method of claim 10, wherein each of the first content and the second content comprises the same image, and the portion of the pixels is configured to modulate light coming from the surrounding environment to the displayed first content, causing the displayed second content to be visually superimposed over the displayed first content to enhance at least one of a brightness and a contrast of the image.

12. The adaptive masking method of claim 10, wherein each of the first content and the second content comprises the same image and is displayed with a respective brightness level, and the portion of the pixels is configured to modulate light coming from the surrounding environment to the displayed first content, causing the displayed second content to be visually superimposed over the displayed first content to render a depth of the image adjustable by changing the brightness levels.

13. The adaptive masking method of claim 10, wherein the portion of the pixels is configured to modulate light coming from an object in the scenery to enhance at least one of a brightness and a contrast of the object.

14. The adaptive masking method of claim 10, further comprising:
   capturing, via an image acquisition system, an image of the scenery; and
   determining object information concerning at least one of a size, a color, and a 3D position of an object in the scenery according to the image;
   wherein the first content is displayed according to the object information, and the light modulation is performed according to the object information.

15. The adaptive masking method of claim 10, wherein the light modulator is an Electro-Wetting Display, a Liquid-Crystal Display (LCD), or an Organic Light-Emitting Diode (OLED) display.

16. The adaptive masking method of claim 10, wherein each of the pixels has a permittivity that can be controlled using an electronic signal applied to the pixel, and a pattern of the permittivities of the pixels across the array causes diffraction that modulates light.

17. The adaptive masking method of claim 10, wherein the display system comprises an optical assembly and a projector for introducing the first content to the optical assembly for display.

18. The adaptive masking method of claim 10, wherein each of the first content and the second content comprises the same light-field image, and the portion of the pixels is configured to modulate light coming from the surrounding environment to the displayed first content, causing the displayed second content visually to be superimposed over the displayed first content to render a 3D visual effect.

* * * * *